US006779323B2

(12) United States Patent
Hancock et al.

(10) Patent No.: US 6,779,323 B2
(45) Date of Patent: Aug. 24, 2004

(54) ELONGATE BARRIER SYSTEM FOR USE WITH LAWN MOWER DECKS

(75) Inventors: Frank H. Hancock, Jackson, GA (US); Stephen C. Price, Barnesville, GA (US)

(73) Assignee: Snapper Products, Inc., McDonough, GA (US)

(*) Notice: Subject to any disclaimer, the term of this patent is extended or adjusted under 35 U.S.C. 154(b) by 0 days.

(21) Appl. No.: 10/420,008

(22) Filed: Apr. 18, 2003

(65) Prior Publication Data

US 2004/0020178 A1 Feb. 5, 2004

Related U.S. Application Data

(60) Provisional application No. 60/373,523, filed on Apr. 18, 2002.

(51) Int. Cl.[7] .............................................. A01D 69/00
(52) U.S. Cl. .................................... 56/10.2 J; 56/10.8
(58) Field of Search ................................ 56/10.8, 10.5, 56/10.2 R, 10.2 A–10.2 J; 318/138, 139, 282; 180/273, 53.1, 272, 271, 214

(56) References Cited

U.S. PATENT DOCUMENTS

| 1,174,709 A | 3/1916 | Gilbert |
| 2,588,815 A | 3/1952 | Fasolino |
| 3,570,225 A | 3/1971 | Miskiewicz |
| 3,984,967 A | 10/1976 | Jones |
| 3,999,643 A | 12/1976 | Jones |
| 4,688,656 A | 8/1987 | Kent |
| 5,148,886 A | 9/1992 | Parsons |
| 5,314,038 A | 5/1994 | Peterson, Jr. |
| 5,528,888 A | 6/1996 | Miyamoto et al. |
| 5,703,450 A | 12/1997 | Josephs |
| 5,994,857 A | 11/1999 | Peterson, Jr. et al. |
| 6,026,645 A | 2/2000 | Stokes et al. |
| 6,044,632 A | 4/2000 | Schmalz et al. |
| 6,109,010 A | 8/2000 | Heal et al. |

FOREIGN PATENT DOCUMENTS

JP 10006890 A 1/1998

*Primary Examiner*—Robert E Pezzuto
(74) *Attorney, Agent, or Firm*—Michael Best & Friedrich LLP

(57) ABSTRACT

One or more elongate barriers are provided that are movably (in one configuration pivotably) mounted proximate the outside of a grass cutting deck. When one of the barriers encounters a foreign object in a certain manner, the barrier moves towards its "tripped" position, thus causing a corresponding change to the operating characteristic of the lawn mower, be it a termination of the cutting process, the mower drive process, or both. The barriers can be used with electric or mechanical control elements.

14 Claims, 7 Drawing Sheets

ELONGATE BARRIER SYSTEM FOR USE WITH LAWN MOWER DECKS

CROSS REFERENCE TO RELATED APPLICATION

The present application claims the full benefit and priority of pending U.S. provisional patent application serial No. 60/373,523, filed Apr. 18, 2002, entitled "Elongate Barrier System for Use with Lawn Mower Decks". The entire contents of this provisional patent application are incorporated by reference.

TECHNICAL FIELD

The present invention relates generally to lawn mowers, and particularly relates to barriers configured to be put in front of, to the rear of, or similarly adjacent to a lawn mower cutting deck, and interaction of said barriers with cutting or other operating processes of the lawn mower through electric or mechanical means.

BACKGROUND OF THE INVENTION

Lawn mowers are well known in the art. Improvements to same are always in demand, while at the same time understanding that costs provide practical limitations.

SUMMARY OF THE INVENTION

The present invention relates to barriers that provide sensing and response to objects too close to a grass cutting deck or another portion of the lawn cutting apparatus.

Generally described, the present invention relates to a control apparatus for use with a lawn mower for cutting grass or other vegetation, the lawn mower configured for traveling in a forward and a rearward direction and including a cutting blade and a cutting blade housing partially enclosing the cutting blade, the cutting blade having controls for enabling and disabling cutting, the control apparatus comprising a front barrier member movably attached to the cutting blade housing and configured to move from a set to a tripped position upon contact with an external object when the lawn mower is traveling in the forward direction, a rear barrier member movably attached to the cutting blade housing and configured to move from a set to a tripped position upon contact with an external object when the lawn mower is traveling in the rearward direction, a front barrier linkage having first and second ends, the first end being operably attached to the front barrier member, a rear barrier linkage having first and second ends, the first end being operably attached to the rear barrier member, a barrier synchronizing member operably associated with the front and rear barriers such that the front and rear barrier members move together as a barrier combination such that when the front barrier member moves from the set to the tripped position, the rear barrier member moves from the set to the tripped position, and the barrier synchronizing member being operably associated with the controls for the cutting member such that movement of the front and rear barrier members from their the set positions to their the tripped positions causes the cutting member to be disabled. In an alternate version a drive wheel can be disabled.

The present invention also is directed towards a supplemental overriding control apparatus for use with a lawn mower for cutting grass or other vegetation, the lawn mower including an automatic disabling system including a first control having an engaged and a disengaged position for respectively engaging and disengaging the operating function, the first control being biased towards the disengaged position by a first control bias member, and a second control for selectively maintaining the first control in the engaged position against the first control bias member, the supplemental overriding control device comprising, a barrier member being movably attached relative to the lawn mower from a set position to a tripped position, the movement configured to be caused upon contact between the barrier member and a foreign object external and separate from the lawn mower while the lawn mower is moving, and a linkage device operably associate with both the barrier member and the second control, the linkage device configured to override the second control upon movement of the barrier member from the set position to the tripped position, such that the second control is overridden and the second control releases the first control from the set position, allowing the first control bias member to cause the first control to move from the engaged position to the disengaged position.

The invention is also directed towards a method for controlling a lawn mower, the lawn mower including a wheel drive control for controlling the operation of a drive wheel of the lawn mower, the lawn mower also including a cutting blade drive control for controlling the operation of a cutting blade of the lawn mower, the lawn mower also including an external object contacting device which upon contact with an external object causes the wheel drive to be disabled, the lawn mower also including a button for operating a control itself operably associated with the wheel drive control, the method comprising the steps of A) operating the lawn mower such that the external object contacting device contacts an external object and causes the wheel drive to be disabled, B) disengaging the wheel drive control, C) pushing and holding the button, and D) engaging the wheel drive control while the button is held so that the lawn mower may be operated to move to a different location such that the external object is not in contact with the external object contacting device.

The present invention is also directed towards a method for controlling a lawn mower, the lawn mower including a wheel drive control for controlling the operation of a drive wheel of the lawn mower, the lawn mower also including a cutting blade drive control for controlling the operation of a cutting blade of the lawn mower, the lawn mower also including an external object contacting device which upon contact with an external object causes the wheel drive and the cutting drive to be disabled, the method comprising the steps of A) operating the lawn mower such that the external object contacting device contacts an external object and causes the wheel drive and the cutting blade drive to be disabled, B) disengaging the wheel drive control, C) disengaging the cutting blade drive control., D) engaging the wheel drive control while the cutting blade drive control is disengaged so that the lawn mower may be operated to move to a different location such that the external object is not in contact with the external object contacting device, and E) engaging the cutting blade drive control.

Therefore it is an object of the present invention to provide an improved lawn mower configuration.

It is a further object of the present invention to provide an improved lawn mower configuration which provides for the stopping of a blade when a foreign object is contacted.

It is a further object of the present invention to provide an improved lawn mower configuration which provides for the stopping of an engine when a foreign object is contacted.

It is a further object of the present invention to provide an improved lawn mower configuration which provides for the stopping of a blade and engine when a foreign object is contacted.

It is a further object of the present invention to provide an improved lawn mower configuration which includes trippable barriers.

It is a further object of the present invention to provide an improved lawn mower configuration which includes trippable barriers which provides for the stopping of a blade and engine when a foreign object is contacted.

It is a further object of the present invention to provide an improved lawn mower configuration which includes linked trippable barriers which provides for the stopping of a blade and engine when a foreign object is contacted by either barrier.

It is a further object of the present invention to provide an improved lawn mower configuration which includes an ABS system which can be overridden.

It is a further object of the present invention to provide an improved lawn mower configuration which includes an ABS system which can be overridden when a foreign object is detected or contacted.

It is a further object of the present invention to provide an improved lawn mower configuration which includes an ABS system which can be overridden when a foreign object is detected or contacted by a barrier member.

It is a further object of the present invention to provide an improved lawn mower configuration which includes an ABS system which can be overridden when a foreign object is detected or contacted by a barrier member, such overriding causing the stoppage of a cutting blade.

It is a further object of the present invention to provide an improved lawn mower configuration which includes a system which can be overridden when a foreign object is detected or contacted by a barrier member, such overriding causing the stoppage of a drive wheel.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Figure 1:
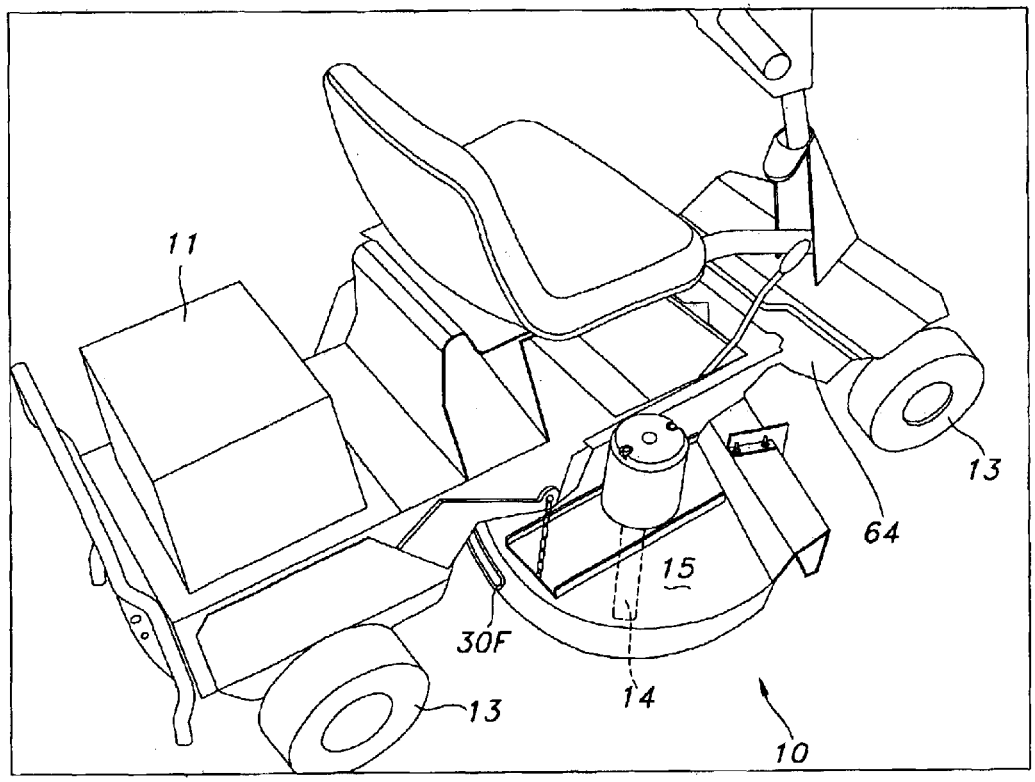
FIG. 1 shows an overall view of a grass cutting vehicle 10. Thus figure shows the vehicle with an exemplary engine or motor 11. The invention contemplates use of any suitable motor 11, including an internal combustion engine or a battery/electric motor combination. A cutting blade 14 is partially enclosed by a cutting deck 15.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

General Description

Generally described, the invention relates to the use of one or more elongate barriers that are movably (in one configuration pivotably) mounted proximate the outside of a grass cutting deck. When one of the barriers encounters a foreign object in a certain manner, the barrier moves towards its "tripped" position, thus causing a corresponding change to the operating characteristics of the lawn mover, be it a termination of the cutting process, the mower drive process, or both.

Element List

The following elements are used for or in connection with the invention:

Lawn mower 10
   Motor 11
   Wheels 13
   Cutting blade 14
   Cutting deck 15 (a.k.a blade housing, cutter blade housing, cutter housing, cutting blade housing)
   Blade Driving Electric Motors 16
Front barrier 30F
Rear barrier 30R
Front shield linkage 31F Rear shield linkage 31R
Bell Crank 34
Latch disengagement spring 35 (a.k.a., Third Spring 35)
Cutting blade engagement lever 40
  Cutting Blade return spring 41 (a.k.a. First Spring 41)
ABS system 60
  ABS frame 61
  Pivoting latch member 62
  Roller latch 63
  Blade pedal 64
  Latch engagement spring 66 (a.k.a., Second Spring 66)

The Blade Engagement Lever and the ABS Assembly

The present invention is used in association with a cutting blade engagement lever 40 used in association with an ABS (Automatic Blade Stop) system 60. Reference to same may be made with respect to FIGS. 5, 6 and 7.

Figure 6:
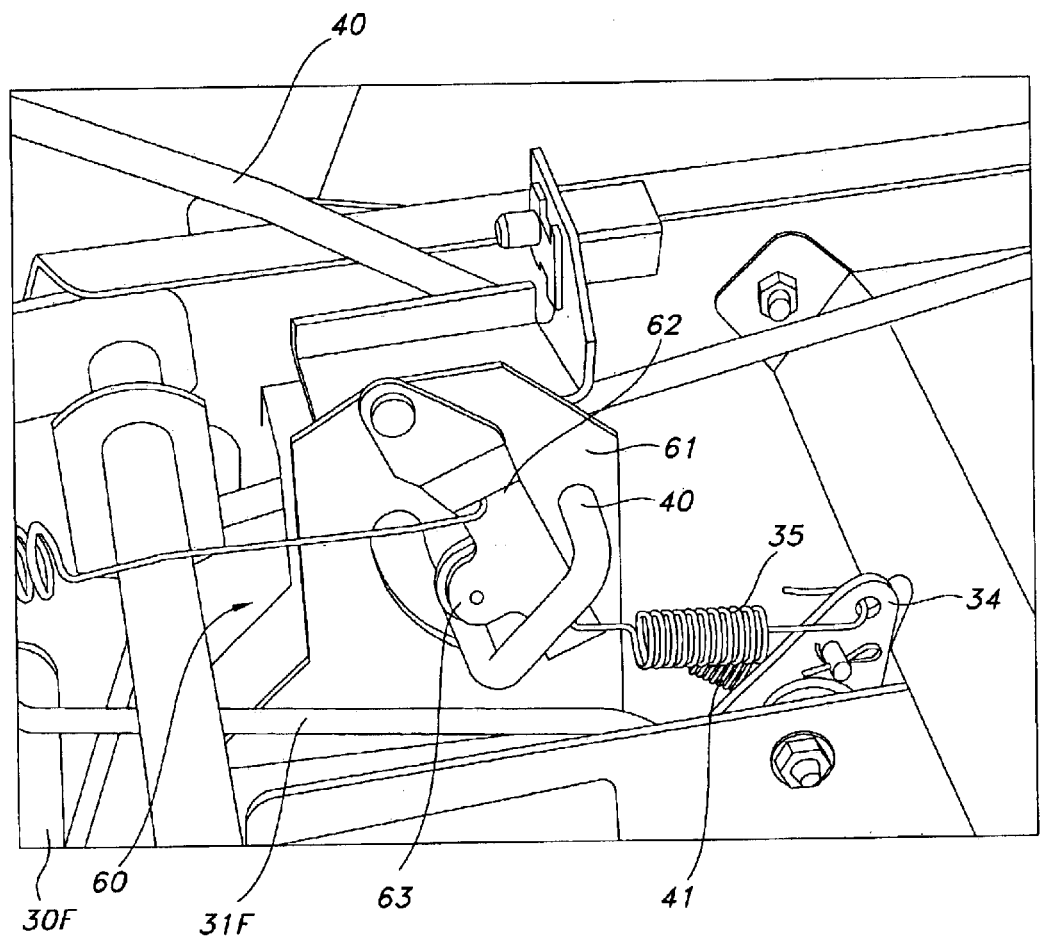
FIG. 6 shows the configuration is in its "tripped" position; the bell crank 34 has rotated relatively clockwise from the viewer's standpoint, and the cutting blade engagement lever 40 has pivoted down to its "down" position. It should be understood that in this position both barriers are each in their "tripped" positions.

The cutting blade engagement lever 40 is pivotably movable between a down (blade disengaged) position, and an up (blade engaged) position. The cutting blade engagement lever 40 is biased towards the down position as shown in FIG. 6 by use of a cutting blade return spring 41 (a.k.a. First Spring 41). The ends of this tension spring 41 are attached at suitable locations to the cutting blade engagement lever 40 and the frame of the cutting deck 15, respectively, such that the cutting blade engagement lever 40 is so biased towards the down position.

The cutting blade engagement lever 40 is substantially in the form of an elongate yet bent rod member, and includes a main lever portion, a substantially straight bearing portion which extends at a right angle from one end of the main lever portion, a substantially straight radial portion which extends at a right angle from the bearing portion, and a substantially straight latch portion which extends at a right angle to the radial portion. The pivoting movement of the overall lever is about the longitudinal axis of the straight bearing portion, as it is a the only "captured" portion, being captured relative to the ABS frame 61 such that it can rotate about its longitudinal axis. Such rotation causes a radial "sweeping" action of the radial portion, much in the manner of a traditional automotive windshield wiper, such that the latch portion moves within the arcuate slot. As described elsewhere, a roller-type roller latch 63 is selectively placed within the arcuate slot by operation of the blade pedal 64.

A presence switch (not shown) may be used to detect the location of the cutting blade engagement lever 40, and suitable electric controls may be used to facilitate engagement of electric drive motor(s) which drive the blade(s). However it may also be understood that an all-manual system could also be used in which movement of the cutting blade engagement lever 40 causes movement of an idler pulley which causes a blade drive belt to be engaged and disengaged as known in the art to allow a motor to drive the blade(s) through the blade drive belt.

The ABS system 60 is such as one developed by Snapper, Inc., and works in conjunction with the cutting blade engagement lever 40 and includes an ABS frame 61, a pivoting latch member 62, a roller latch 63, a blade pedal 64 (see FIG. 1), and a latch engagement spring 66 (a.k.a., Second Spring 64).

Figure 5:
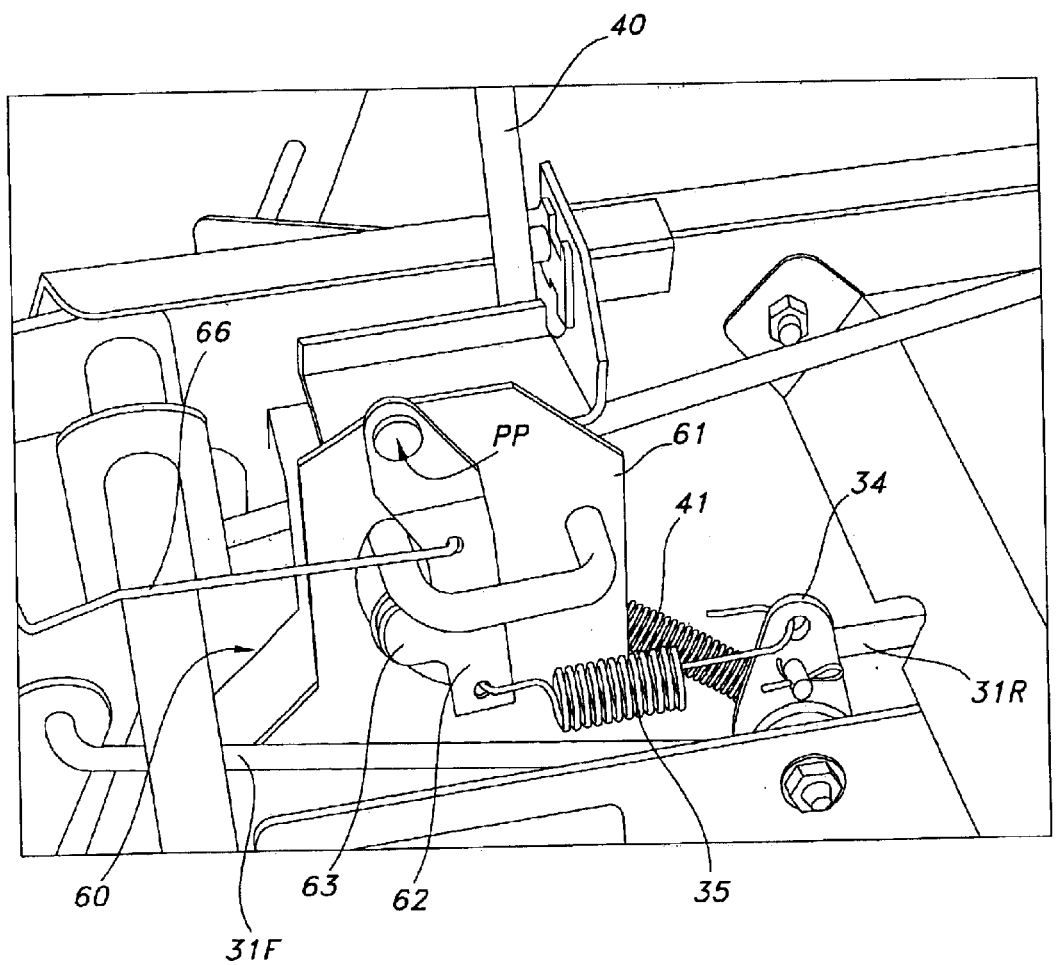
FIG. 5 shows the cutting blade engagement lever 40 is in its "up" or "latched" position. As may be understood, the pivoting latch member 62 has latched the latch portion of the cutting blade engagement lever 40 in place. The cutting blade return spring 41 (a.k.a. First Spring 41) is stretched.

The ABS frame 61 is rigidly attached to the cutting deck 15. As shown in FIGS. 5 and 6, the pivoting latch member 62 is pivotably attached to the ABS frame 61, about pivot point PP (see FIG. 5). Roller latch 63 is rotatably attached to the pivoting latch member 62. The blade pedal 64 is pivotably attached relative to the frame of the vehicle about an axis which is substantially transverse to the normal forward travel of the vehicle. A latch engagement spring 66 (a.k.a., Second Spring 66) has its opposite ends attached to the blade pedal 64 and the pivoting latch member 62.

The functions of the elements above are now discussed.

In this ABS configuration, the cutting blade engagement lever 40 (see e.g., FIGS. 3, 5 and 6) is used to allow the user to manually select, by pivotal movement of the lever, whether or not the cutting blade is engaged. Typically, this is done by an operator (not shown) grasping the lever and pulling it rearward relative to the normal forward travel of the lawn mower.

Figure 7:
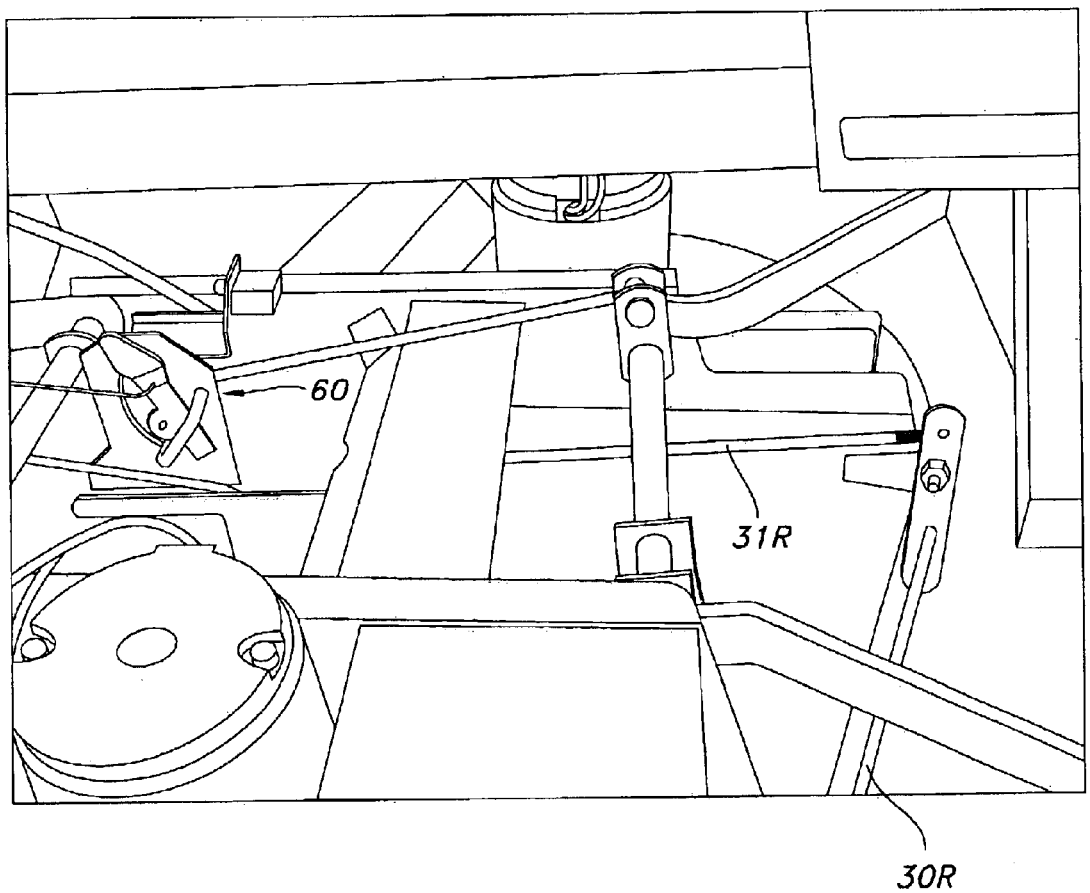
FIG. 7 is another view showing the overall ABS configuration in its "tripped", position. Note the rear barrier 30R is in its "tripped" position, with rod 31R attached thereto.

If the operator engaged the cutting blade engagement lever 40 but did not operate the blade pedal 64, and the operator then released the cutting blade engagement lever 40, it would spring back (due to spring 41) to its down position. However, if the operator presses down with one or more foot on the blade pedal 64, while the cutting blade engagement lever 40 is in its engaged ("up") position, the intermediate existence of the latch engagement spring 66 will cause pivoting latch member 62 to pivot from the position shown in FIG. 6 to the position shown in FIG. 5. Roller latch 63 is thus positioned in the arcuate slot in the base of the ABS frame 61, such that the latch portion of the cutting blade engagement lever 40 is blocked from movement back towards its "blade disengaged" position as shown in FIGS. 6 and 7.

The rolling nature of the roller latch allows the latch portion of the cutting blade engagement lever 40 to "roll" past the roller latch to reduce wear.

Once the cutting blade engagement lever 40 is so engaged by the roller latch, the cutting blade engagement lever can be released by the operator, and it will stay in its latched position until the blade pedal 64 is released (or until such latching is overridden as described elsewhere). Upon release of the blade pedal 64, the cutting blade engagement lever is no longer latched, and it moves back into its down position, thus disengaging the blade.

Cutting Deck Barriers; Linkages, Bell Crank

One feature of the invention includes the use of cutting deck barriers 30F, 30R, which are configured to be tripped upon contacting a foreign object, thus causing disengagement of the blade, the clutching of the engine to the drive train, shutting down of the engine, or any combination thereof.

These elongate front and rear barriers 30F, 30R, are elongate in that they extend around along a substantial portion of the skirt of the cutting blade deck. In the embodiment shown, for example in FIG. 2, the front barrier 30F extends along a substantial part of the front edge of the cutting blade deck (to contact obstructions while going forward) and the rear barrier 30R extends along a substantial part of the rear edge of the cutting blade deck (to contact obstructions while going rearward). FIG. 7 also shows the location of the rear barrier 30R.

Each barrier member is pivotably mounted relative to the cutting deck 15 at one or more locations. This pivot action is shown for example in FIG. 4. In one embodiment, a pivoting connection is provided at two locations.

Figure 2:
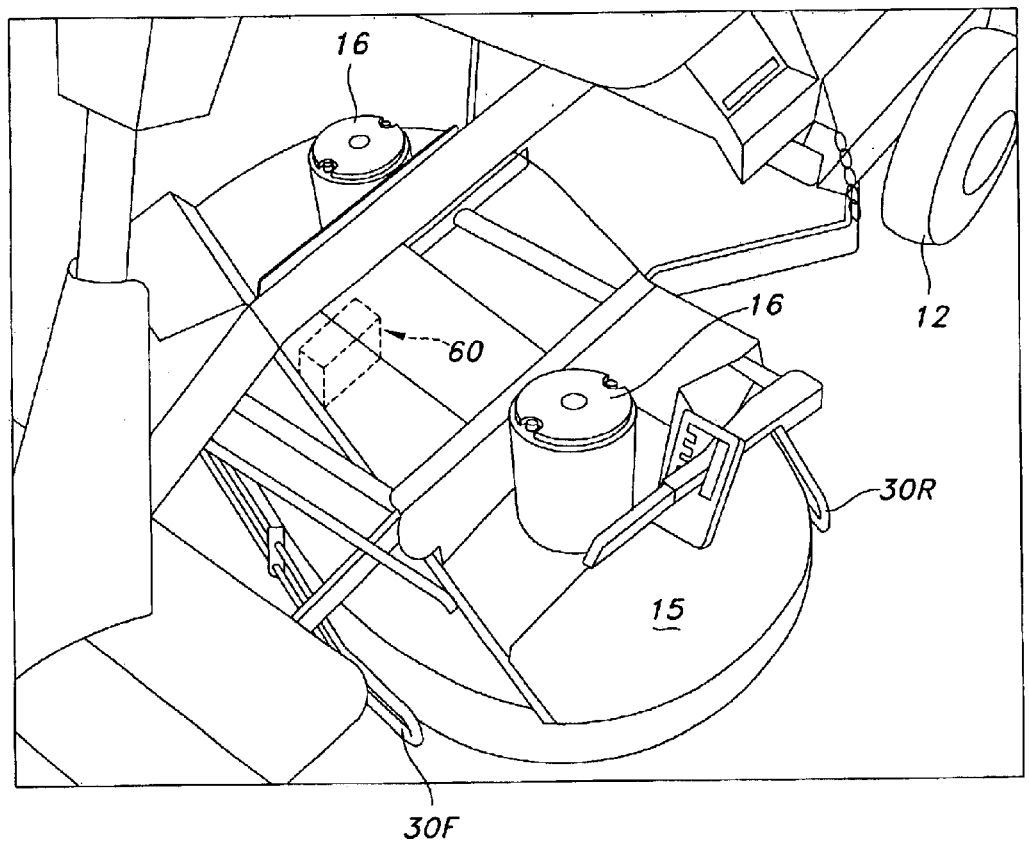
FIG. 2 is a pictorial view of a portion of the apparatus 10, viewed from the left and front of the vehicle. This view illustrates the front barrier 30F, and the rear barrier 30R, both positioned in a pivoting relationship relative to the cutting deck 15. On the cutting deck 15 are located two cutting blade driving electric motors 16. A rear wheel 12 is also shown. The body of the ABS System 60 is shown generally in dotted line to illustrate its general location.
Figure 3:
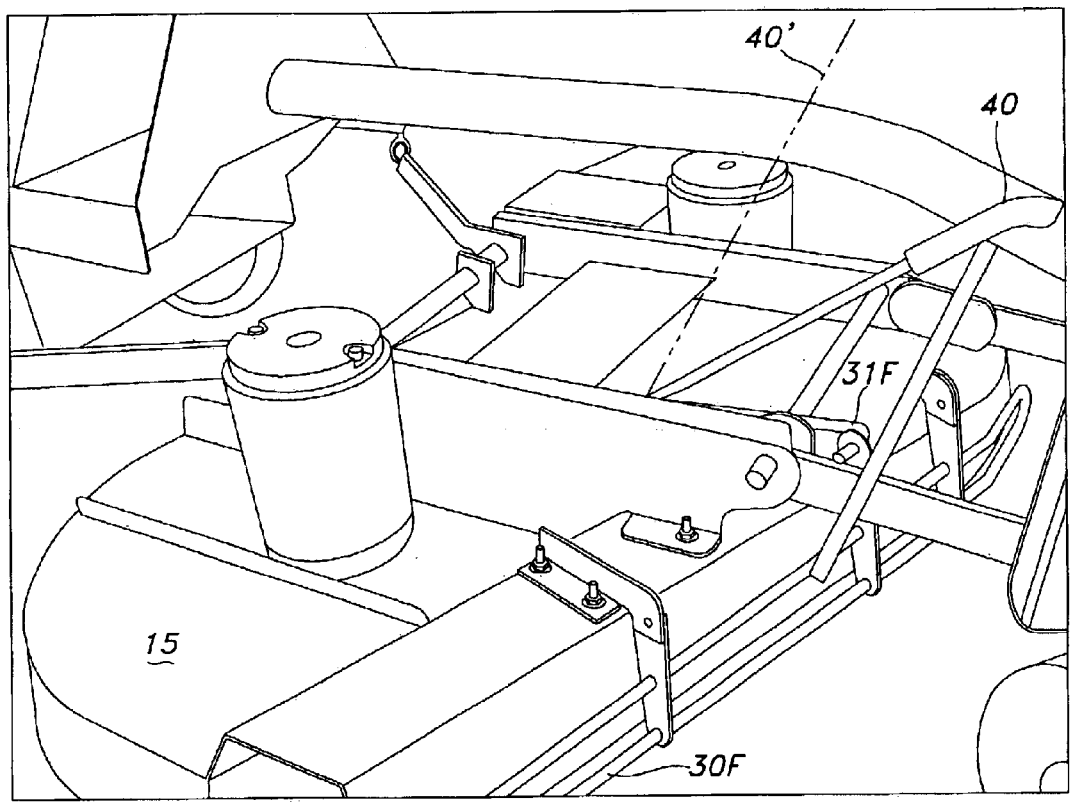
FIG. 3 is a view from the left side of the vehicle (with the vehicle rear to the viewer's left, and the front to the viewer's right), illustrating the location of the front barrier 30F, which extends along the front of the cutting deck 15. The cutting blade engagement lever 40 is shown in its "down" position (the front barrier 30F is shown "tripped"). It should be understood that the blade engagement lever might also be positioned at a location similar to that shown in dotted line as 40', by pivoting it. This pivoting action is provided as known in the art by the operator bending forwardly at the waist, grasping the handle at the free end of the lever 40, and pulling it rearwardly and upwardly. The position 40 could be considered the "down" (or "tripped") position, whereas position 40' could be considered the "up" (or "set") position.
Figure 4:
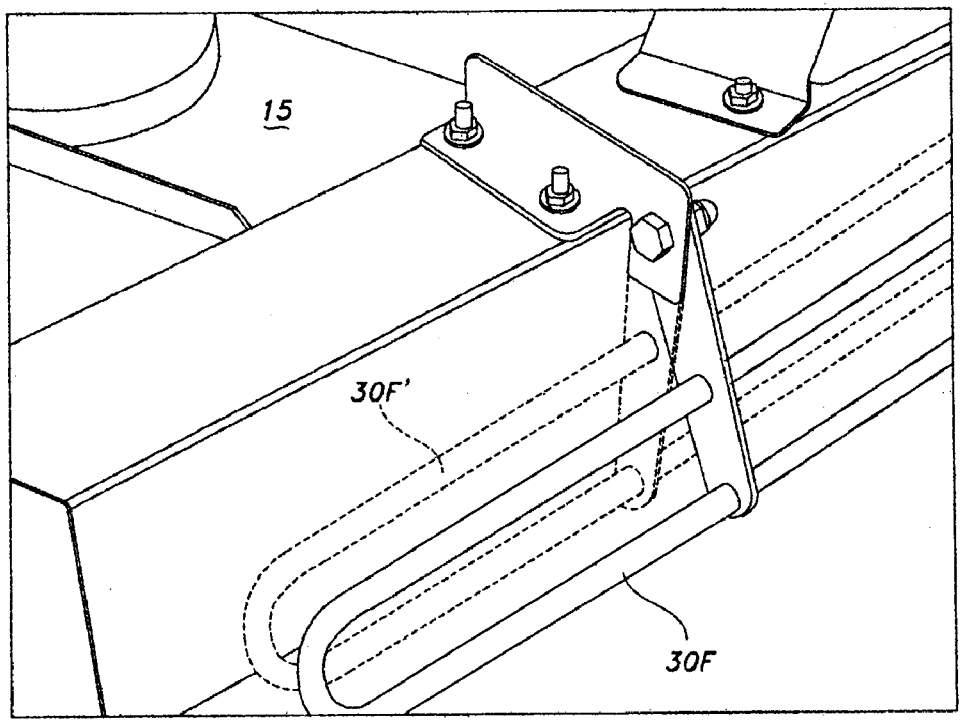
FIG. 4 is a more detailed view of a right section of the front barrier 30F, shown in solid line in its "set" position. As may be seen, the lower edge is spaced out from the cutting deck. A pivot point is provided by suitable fasteners as known in the art (a hex head machine screw is shown). In fact, two pivot points per front barrier are used under the present invention, although other configurations may be used in the art without departing from the present invention. These pivot points allow the front barrier 30F to also move to a "tripped" position, which is shown in dotted line as 30F'. As may be seen, the lower edge of the front barrier is closer to the front of the cutting deck when in the tripped position.

The front barrier 30F is shown in, for example, FIGS. 2, 3, and 4. The rear barrier 30R is shown in, for example, FIGS. 2 and 7.

Each of the barrier members 30F, 30R, is also pivotably attached to a corresponding linkage member 31F, 31R. Linkage member 31F is shown in FIG. 6, for example and linkage member 31R is shown in FIG. 5, for example. Each linkage member has one end attached to its corresponding barrier member and the other end pivotably attached to a corresponding end of a bell crank 34 (see FIGS. 5 and 6).

Each linkage member is attached to the barrier member via a flange that extends upwardly and is part of the barrier member, such as shown in FIGS. 5, 6, and 7.

The bell crank 34 is substantially elongate, and is pivotally mounted about its middle relative to the cutting deck. Its "upper" end is attached to the forward end of the linkage member 31R as shown in FIG. 5, and its lower end is pivotally attached to the rearward end of the linkage member 31F of FIG. 6.

The bell crank 34 also provides an attachment location for one end of a spring 66, described elsewhere.

The linkages 31F, 31R, are configured such that if the front barrier 30F is tripped, it rotates the bell crank 34 in a first direction, being generally clockwise as FIG. 6 is referenced. If the rear barrier 30R is tripped, it rotates the bell crank 34 in the same first direction. This rotation may be thought of as towards the "tripped" position. The front and rear barriers move together in what could be referenced as a "barrier combination".

Therefore it may be seen that movement of the two barrier members 30F, 30R, is linked together via the use of the intermediate linkages 31F, 31R and the bell crank 34; if one barrier member is tripped by an obstruction, both go to their tripped positions.

Third Spring

By use of a third spring 35 (a.k.a., the latch disengagement spring 35) the latch member 62 can be overridden from its latched position (FIG. 5) and moved to its unlatched position (FIG. 6), so as to unlatch the cutting blade engagement lever 40, causing the blade to stop.

This tension spring 35 has one end attached to the bell crank 34 (above its pivot point as shown in FIG. 14) and the other attached to the latch member 62. The relative strength of the latch disengagement spring 35 allows it to override the latch engagement spring 66 when the bell crank 34 is rotated from the position shown in FIG. 5 to the position shown in FIG. 6. This overriding takes the form of unlatching the cutting blade engagement lever 40.

Thus it may be seen that the third spring 35, used in conjunction with the bell crank 34, linkages 31F, 31R and barriers 30F, 30R, allow for the latch member 62 to be overridden even though the blade pedal is depressed. In summary it may then be said that the tripping of either of the barrier members 30F, 30R, causes the overriding of the pivoting latch member 62, and disengagement of the blade.

Overall Operation of System

Operation of the overall system will now be discussed. It will first be assumed that the cutting blade is not engaged.

To engage the blades, an operator pulls the lever up from the position shown in FIG. 6 to the cutting position shown in FIG. 5. This engages the blade (a.k.a., "turns the blade on"). In order to be able to release the blade engagement lever without the lever 40 springing back to its down position, the blade pedal 64 must be pressed by the operator to keep (i.e., "latch") the blade engagement lever 40 in place. Should the operator release the blade pedal 64, the spring pressure on the lever 40 causes the lever 40 to push past the latch roller 63 of the pivoting latch member 62. The latch member moves to the position shown in FIG. 6, thus unlatching the cutting blade engagement lever 40, which then springs back to its "disengaged" position, thus disengaging the blade.

If either of the barriers is tripped while the blade is engaged, the bell crank 34 moves from the position shown in FIG. 5 to the position shown in FIG. 6, thus causing third spring 35 to override second spring 66, thus unlatching the blade engagement lever 40 and terminating the cutting process.

To reset the entire system to a cutting mode, any impediments to the barriers are removed. The blade engagement lever 40 is placed into its engaged position, and is latched in place by depression of the blade pedal. This latching pulls the barriers into their set positions (due to the proper selection of the strength of springs 35, 66, and the configuration of the latching member 62 and the bell crank 34).

Therefore it may be understood that when a front or rear barrier has been tripped, and the barriers are then in their tripped positions, both the ABS and the barrier configurations may be reset by engaging the blade with the blade engagement lever 40 and retaining the blade engagement lever 40 in place by engaging the blade pedal 64.

It should further be understood that should the user release the brake pedal 64 during the cutting process without the barriers being tripped, the barriers will nonetheless tend to go to their "tripped" positions due to the effect of gravity.

Alternatives

The barriers can be on the front or the back of the deck, as shown, but they could also be on the front or back of the lawnmower. In the latter such situation a sheathed cable could be used to operably connect the more remote barriers to the ABS unit.

The cutting apparatus illustrated in the drawings is configured to be electric, and with such an apparatus the blades could just be turned off. However, the wheels could also be stopped with or without the blades stopping. However it should be understood that the invention could be used in conjunction with gasoline or other powered lawn mowers.

First Alternative Electrical Controller Configuration

The barrier(s) shown above could also be used in conjunction with an electric switch which activates when the barrier is tripped and remains activated until the barrier is moved back to the untripped position.

A controller could also be used which is linked to an "ignition" key (OFF/ON) the blade control (OFF/ON) and the drive (either the drive motor or a clutch) and the switch noted above.

If the barrier hits a foreign object, power is shut off to the controller.

When power is shut off to the controller, one or more of the following happens: blade is turned off, electric motor is turned off, or wheel drive clutch is turned off.

In order to get power back to the controller while the barrier is still tripped, a push button is used to bypass the barrier circuit. If this push button is pushed and power is provided to the controller while the blade is still engaged (or the blade control is in engaged mode) nothing happens except maybe a warning signal.

If the blade is disengaged but the drive is engaged when the button is pushed, depending on the preference of the manufacturer the mower may or may not be able to operate in drive mode (e.g., to back off the foreign object).

The ignition or in this case the power on/off switch will disable the transmission and blade drive when it is turned off. If the operator tries to turn the power on/off switch on with the blade engaged or the transmission control lever in drive, the main controller will not let anything happen.

So if the operator trips a barrier switch but wants to drive away from the object, the process is to: 1. disengage the wheel drive lever; 2. disengage the blade; 3. push the button down and hold it while driving away from the object. Depending on the preference of the manufacturer, when the operator releases the button, the operator may or may not have to reset the key switch to continue.

Second Alternative Electrical Controller Configuration

A second alternative embodiment can include the use of a controller which includes inputs from momentary switches which are tripped by associated barriers (no linkages or bell cranks used). In this situation, if a barrier is tripped, the corresponding switch causes a momentary break in power to the controller. However, this power is quickly restored to the controller due to the momentary nature of the switch. If the mower was in a cutting mode and a wheel driving mode, the controller will not allow cutting or wheel driving to be restarted (even if the mower directional control is in "drive" and the cutting control is in the "cutting" position). In order to get back into driving and cutting modes, the controller will have to receive signals that the cutting blade control has been disengaged (cutting off) and the drive control has been placed in neutral or park. Once this has been recognized the controller will allow driving and cutting modes to be reselected. Typically the user would then re-engage driving mode until the obstacle is cleared, and then cutting could be restarted.

Conclusion

While the present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

That which is claimed:

1. A control apparatus for use with a lawn mower for cutting grass or other vegetation, said lawn mower configured for traveling in a forward and a rearward direction and including a cutting blade and a cutting blade housing partially enclosing said cutting blade, said cutting blade having controls for enabling and disabling cutting, said control apparatus comprising:

a front barrier member movably attached to said cutting blade housing and configured to move from a set to a tripped position upon contact with an external object when said lawn mower is traveling in said forward direction;

a rear barrier member movably attached to said cutting blade housing and configured to move from a set to a tripped position upon contact with an external object when said lawn mower is traveling in said rearward direction;

a front barrier linkage having first and second ends, said first end being operably attached to said front barrier member;

a rear barrier linkage having first and second ends, said first end being operably attached to said rear barrier member;

a barrier synchronizing member operably associated with said front and rear barriers such that said front and rear barrier members move together as a barrier combination such that when said front barrier member moves from said set to said tripped position, said rear barrier member moves from said set to said tripped position; and said barrier synchronizing member being operably associated with said controls for said cutting member such that movement of said front and rear barrier members from their said set positions to their said tripped positions causes said cutting member to be disabled.

2. The control apparatus as claimed in claim 1, wherein said barrier synchronizing member is a link being linked to both said front and rear barrier linkages such that movement of said front barrier member causes movement of said first linkage member which causes movement of said link which causes movement of said rear barrier member which causes movement of said rear barrier member.

3. A control apparatus for use with a lawn mower for cutting grass or other vegetation, said lawn mower configured for traveling in a forward and a rearward direction by use of a drive wheel driven by a drive motor, said lawn mowever also including a cutting blade and a cutting blade housing partially enclosing said cutting blade, said cutting blade having controls for enabling and disabling cutting, said control apparatus comprising:

a front barrier member movably attached to said cutting blade housing and configured to move from a set to a tripped position upon contact with an external object when said lawn mower is traveling in said forward direction;

a rear barrier member movably attached to said cutting blade housing and configured to move from a set to a tripped position upon contact with an external object when said lawn mower is traveling in said rearward direction;

a front barrier linkage having first and second ends, said first end being operably attached to said front barrier member;

a rear barrier linkage having first and second ends, said first end being operably attached to said rear barrier member;

a barrier synchronizing member operably associated with said front and rear barriers such that said front and rear barrier members move together as a barrier combination such that when said front barrier member moves from said set to said tripped position, said rear barrier member moves from said set to said tripped position; and said barrier synchronizing member being operably associated with said drive motor for said drive wheel such that movement of said front and rear barrier members from their said set positions to their said tripped positions causes said drive wheel to be disabled.

4. The control apparatus as claimed in claim 3, wherein said barrier synchronizing member is a link being linked to both said front and rear barrier linkages such that movement of said front barrier member causes movement of said first linkage member which causes movement of said link which causes movement of said rear barrier member which causes movement of said rear barrier member.

5. A supplemental overriding control apparatus for use with a lawn mower for cutting grass or other vegetation, said lawn mower including an automatic disabling system including a first control having an engaged and a disengaged position for respectively engaging and disengaging said operating function, said first control being biased towards said disengaged position by a first control bias member, and a second control for selectively maintaining said first control in said engaged position against said first control bias member, said supplemental overriding control device comprising;

a barrier member being movably attached relative to said lawn mower from a set position to a tripped position, said movement configured to be caused upon contact between said barrier member and a foreign object external and separate from said lawn mower while said lawn mower is moving; and a linkage device operably associate with both said barrier member and said second control, said linkage device configured to override said second control upon movement of said barrier member from said set position to said tripped position, such that said second control is overridden and said second control releases said first control from said set position, allowing said first control bias member to cause said first control to move from said engaged position to said disengaged position.

6. The supplemental overriding control apparatus as claimed in claim 5, wherein said operating function is cutting by a grass cutting blade.

7. The supplemental overriding control apparatus as claimed in claim 5, wherein said operating function is movement of said lawn mower by use of a drive wheel.

8. The supplemental overriding control apparatus as claimed in claim 5, wherein said front and back linkages are linked together to operate together.

9. The supplemental overriding control apparatus as claimed in claim 8, wherein said linking of said front and back linkages is provided by use of a bell crank.

10. A method for controlling a lawn mower, said lawn mower including a wheel drive control for controlling the operation of a drive wheel of said lawn mower, said lawn mower also including a cutting blade drive control for controlling the operation of a cutting blade of said lawn mower, said lawn mower also including an external object contacting device which upon contact with an external object causes said wheel drive to be disabled, said lawn mower also including a button for operating a control itself operably associated with said wheel drive control, said method comprising the steps of:
   A) operating said lawn mower such that said external object contacting device contacts an external object and causes said wheel drive to be disabled;
   B) disengaging said wheel drive control;
   C) pushing and holding said button; and
   D) engaging said wheel drive control while said button is held so that said lawn mower may be operated to move to a different location such that said external object is not in contact with said external object contacting device.

11. The method for controlling a lawn mower as claimed in claim 10, further comprising step "E", being the step of releasing said button, which causes said wheel drive control to be disabled until reset.

12. A method for controlling a lawn mower, said lawn mower including a wheel drive control for controlling the operation of a drive wheel of said lawn mower, said lawn mower also including a cutting blade drive control for controlling the operation of a cutting blade of said lawn mower, said lawn mower also including an external object contacting device which upon contact with an external object causes said wheel drive and said cutting drive to be disabled, said lawn mower also including a button for operating a control itself operably associated with said wheel drive control and said cutting blade drive control, said method comprising the steps of:
   A) operating said lawn mower such that said external object contacting device contacts an external object and causes said wheel drive and said cutting blade drive to be disabled;
   B) disengaging said wheel drive control;
   C) disengaging said cutting blade drive control;
   D) pushing and holding said button; and
   E) engaging said wheel drive control while said button is held so that said lawn mower may be operated to move to a different location such that said external object is not in contact with said external object contacting device.

13. The method for controlling a lawn mower as claimed in claim 12, further comprising step "E", being the step of releasing said button, which causes said wheel drive control to be disabled until reset.

14. A method for controlling a lawn mower, said lawn mower including a wheel drive control for controlling the operation of a drive wheel of said lawn mower, said lawn mower also including a cutting blade drive control for controlling the operation of a cutting blade of said lawn mower, said lawn mower also including an external object contacting device which upon contact with an external object causes said wheel drive and said cutting drive to be disabled, said method comprising the steps of:
   A) operating said lawn mower such that said external object contacting device contacts an external object and causes said wheel drive and said cutting blade drive to be disabled;
   B) disengaging said wheel drive control;
   C) disengaging said cutting blade drive control;
   D) engaging said wheel drive control while said cutting blade drive control is disengaged so that said lawn mower may be operated to move to a different location such that said external object is not in contact with said external object contacting device; and
   E) engaging said cutting blade drive control.

* * * * *